No. 764,556. PATENTED JULY 12, 1904.
F. T. CABLE.
CLINOMETER.
APPLICATION FILED FEB. 4, 1903.
NO MODEL.
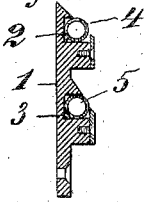
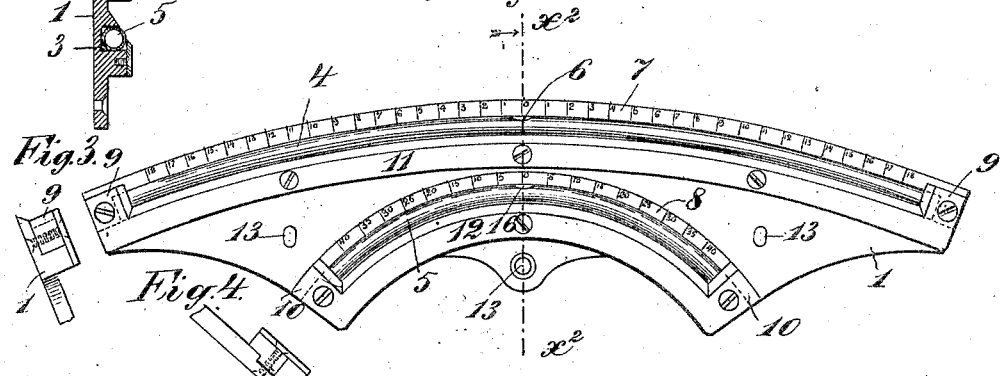
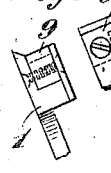
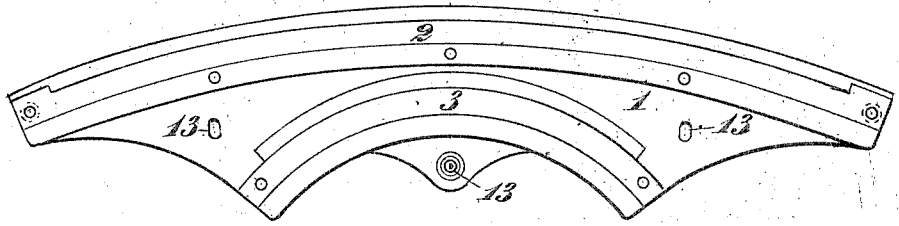
WITNESSES:
INVENTOR
Frank T. Cable
BY
ATTORNEY No. 764,556.

Patented July 12, 1904.

UNITED STATES PATENT OFFICE.

FRANK T. CABLE, OF NEW SUFFOLK, NEW YORK, ASSIGNOR TO ELECTRIC BOAT COMPANY, A CORPORATION OF NEW JERSEY.

CLINOMETER.

SPECIFICATION forming part of Letters Patent No. 764,556, dated July 12, 1904.

Application filed February 4, 1903. Serial No. 141,835. (No model.)

*To all whom it may concern:*

Be it known that I, FRANK T. CABLE, a citizen of the United States, residing at New Suffolk, in the county of Suffolk and State of New York, have invented certain new and useful Improvements in Clinometers, of which the following is a specification.

This invention relates to the class of clinometers in which a glass tube containing a liquid and an air-bubble is employed, the bubble traversing a graduated scale beside or on the tube.

The purpose of the present invention is to provide a clinometer adapted for indicating the rolling of a vessel, wherein it is placed athwartship on a bulkhead in the vessel.

The clinometer includes two curved tubes having curves of different radii and scales calibrated in degrees for the respective bubbles to traverse, all as will be hereinafter described.

In the accompanying drawings, which serve to illustrate an embodiment of the invention, Figure 1 is a face view of the clinometer. Fig. 2 is a cross-section of the same at line $x^2$ in Fig. 1. Figs. 3 and 4 are end views. Fig. 5 is a face view of the tube-holder or metal frame of the clinometer.

A metal frame 1 has in it two curved recesses 2 and 3 to receive two glass tubes 4 and 5, which contain each a liquid, such as alcohol, each tube being so constructed in filling as to provide an air-bubble 6, as in a spirit-level. On beveled faces on the frame above the respective tubes are scales 7 and 8, marked with graduations calibrated in degrees. The tubes are held in place by end pieces 9 and 10, connected, respectively, with plates 11 and 12, secured to the frame. The frame has in it apertures 13 for securing it to the bulkhead by screws or the like. The longer tube, 4, which has the greater radius, has also the graduations of its scale spaced a greater distance apart than the graduations of the scale of the tube 5, which includes a larger part of a circle than the tube 4. As herein shown, the longer tube, 4, includes about one-tenth of a circle, or thirty-six degrees, while the shorter tube includes one-fourth of a circle, or ninety degrees, and the spacing of the graduations are proportioned directly according to the radii of the circles of which the respective tubes form a part.

The object of the invention is to facilitate the reading of the scales when the vessel rolls. If it roll to an extent within, say, eighteen degrees, the upper and more easily read scale may be consulted; but if the roll should exceed the limit of the upper scale then the lower one may be consulted. Both bubbles will indicate the same degree on the two, so far as the limit of the upper scale extends, and in some vessels the extent of the roll in degrees will rarely exceed the limit shown on the upper scale 7, and the wide spacing on this scale makes the reading easier and more accurate.

The advantage of this compound or double-tube construction is most apparent in submarine boats, where accuracy in the reading of the degree or extent of roll, even when moderate, is very important. Obviously it is desirable that the graduations shall be widely spaced, where possible, to facilitate accurate reading and that the extent of the clinometer to include an extraordinary roll of the vessel under abnormal conditions is also very desirable. This latter being a somewhat unusual condition, the closer graduations may be employed for denoting them.

I am well aware that it is not new to employ a curved bubble-tube and a corresponding scale in a spirit-level, and this I do not claim. It is the compound or double-tube construction in one instrument, the tubes differing in radius of curvature and in coarseness or spacing of the scale-graduations, which constitutes the important and novel feature and the feature which lends special utility to the instrument. It will be noted that the two tubes are so disposed that a line passing through the centers of both curves bisects both the tubes at the zero-points on the scales.

Having thus described my invention, I claim—

A clinometer comprising a frame 1, having in it curved recesses and scales 7 and 8 along the margins of said recesses, two bubble-tubes 4 and 5 mounted in said recesses, and means for securing said tubes in their recesses, the said tubes being of different lengths and curved with different radii, and the scales having their graduations calibrated to degrees of circles corresponding to their respective radii, substantially as and for the purpose set forth.

In witness whereof I have hereunto signed my name, this 16th day of January, 1903, in the presence of two subscribing witnesses.

FRANK T. CABLE.

Witnesses:
H. G. TUTHILL,
F. L. BRAKE.